US007898950B2

(12) United States Patent
Barkley et al.

(10) Patent No.: US 7,898,950 B2
(45) Date of Patent: Mar. 1, 2011

(54) TECHNIQUES TO PERFORM RATE MATCHING FOR MULTIMEDIA CONFERENCE CALLS

(75) Inventors: Warren V. Barkley, Redmond, WA (US); Philip A. Chou, Bellevue, WA (US); Regis J. Crinon, Camas, WA (US); Tim Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/506,429

(22) Filed: Aug. 18, 2006

(65) Prior Publication Data

US 2008/0043644 A1    Feb. 21, 2008

(51) Int. Cl.
*H04Q 11/00* (2006.01)
*H04L 12/16* (2006.01)

(52) U.S. Cl. ..................... 370/230.1; 370/260
(58) Field of Classification Search .......... None
See application file for complete search history.

(56) References Cited

U.S. PATENT DOCUMENTS

| | | | |
|---|---|---|---|
| 5,751,791 A | | 5/1998 | Chen et al. |
| 6,014,694 A | * | 1/2000 | Aharoni et al. ............. 709/219 |
| 6,075,571 A | | 6/2000 | Kuthyar et al. |
| 6,104,705 A | | 8/2000 | Ismail et al. |
| 6,496,217 B1 | | 12/2002 | Piotrowski |
| 6,747,991 B1 | * | 6/2004 | Hemy et al. ............. 370/468 |
| 7,007,098 B1 | | 2/2006 | Smyth et al. |
| 2003/0076858 A1 | | 4/2003 | Deshpande |
| 2005/0094726 A1 | | 5/2005 | Park |
| 2006/0078049 A1 | | 4/2006 | Bao et al. |
| 2006/0165302 A1 | | 7/2006 | Han et al. |
| 2007/0165820 A1 | | 7/2007 | Krantz et al. |
| 2008/0158339 A1 | * | 7/2008 | Civanlar et al. ............ 348/14.09 |

FOREIGN PATENT DOCUMENTS

CN    1515118 A    7/2004
WO    WO/2008/082375    7/2008

OTHER PUBLICATIONS

Wu, Feng, "A Framework for Efficient Progressive Fine Granularity Scalable Video Coding," IEEE Transactions on Circuits and Systems for Video Technology, Mar. 2001, pp. 332-344, vol. 11, No. 3.
Zhu, Bin B., "Scalable Protection for MPEG-4 Fine Granularity Scalability," IEEE Transactions on Multimedia, Apr. 2005, pp. 222-233, vol. 7, No. 2.

* cited by examiner

*Primary Examiner* — Chirag G Shah
*Assistant Examiner* — Minh-Trang Nguyen (57) ABSTRACT

Techniques to perform rate matching for multimedia conference calls are described. An apparatus may comprise a conferencing server and a rate matching module. The rate matching module may be arranged to adjust bit rates between media communications channels for client terminals in a conference call, with the rate matching module to remove video frames from a set of video information received on a first media communications channel to reduce a bit rate for the video information. Other embodiments are described and claimed.

20 Claims, 10 Drawing Sheets

TECHNIQUES TO PERFORM RATE MATCHING FOR MULTIMEDIA CONFERENCE CALLS

BACKGROUND

Multimedia conference calls typically involve communicating voice, video, and/or data information between multiple endpoints. With the proliferation of data networks, multimedia conferencing is migrating from traditional circuit-switched networks to packet networks. To establish a multimedia conference call over a packet network, a conferencing server typically operates to coordinate and manage the conference call. Each participant may connect to the conferencing server using various types of media communications channels operating at varying connection speeds or bandwidths. For example, various participants may connect to the conferencing server using a lower bandwidth public switched telephone network (PSTN) telephone connection, a medium bandwidth digital subscriber link (DSL) modem connection or cable modem connection, a higher bandwidth intranet connection (e.g., Fractal T1, T1, T3, and so forth), as well as others. This phenomenon is sometimes referred to as bandwidth heterogeneity. Bandwidth heterogeneity, however, may cause problems for a multimedia conference call when attempting to communicate multimedia information created by one participant to other participants in the conference call.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to multimedia conferencing systems. Some embodiments in particular may be directed to techniques for performing rate matching operations for a multimedia conferencing system to support a multimedia conference call having bandwidth heterogeneity between media communications channels. In one embodiment, for example, a multimedia conferencing system may include a conferencing server appropriate for a desired communications standard. Due to bandwidth heterogeneity, the conferencing server may need to perform some form of data rate matching to adjust data rates to the communication channel capacity of each media communication channel. Further, such rate matching operations may need to be dynamic to accommodate changes in the dominant (or active) speaker, traffic conditions and number of participants. Accordingly, the conferencing server may include a rate matching module to adjust bit rates between media communications channels for client terminals in a multimedia (e.g., audio/video) conference call. The rate matching module may perform rate matching operations by selectively removing video frames from video information received on one media communications channel to reduce a bit rate for the video information to a speed that is equal to or less than a bandwidth available for one or more other media communications channels. Other embodiments are described and claimed.

DETAILED DESCRIPTION

Various embodiments may be directed to techniques for performing rate matching operations for a multimedia conferencing system to support a multimedia conference call experiencing bandwidth heterogeneity between various media communications channels. Some embodiments may perform rate matching by reducing a bit rate for a particular set of video information embedded within a video stream or bitstream. A video stream or bitstream may refer to a continuous sequence of segments (e.g., bits or bytes) representing audio and/or video information. In telecommunications and computing, bit rate (or $R_{bit}$) refers to the number of bits that are conveyed or processed per unit of time. In digital multimedia, bit rate refers to the number of bits used per unit of time to represent a continuous medium such as an audio or video stream. It is typically quantified using the bit per second (bit/s) unit or some derivative such as megabits per second (Mbit/s) which is equal to 1 Million bits per second.

Various embodiments may reduce a bit rate by selectively removing frames of video information from the video bitstream. Selection of the video frames in the bitstream may be done with the assistance of the underlying transport protocol (e.g., Real Time Protocol). For example, information regarding the type of video frames may be carried in various headers in one or more of the underlying transport protocol packets. The bit rate may be reduced to accommodate a media communication channel bandwidth estimate for a given media communications channel. The amount of reduction may be controlled by selectively removing certain video frame types and a number of frames for a given video frame type. This effectively lowers a frame rate for the video bitstream (e.g., 60 frames per second to 30 frames per second). Lowering the frame rate reduces the bit rate for the video bitstream. In this manner the original video bitstream may be sent at a bit rate that is equal to or less than the bandwidth available to a media communications channel for a given client terminal. The conferencing server may obtain bandwidth estimates for a given media communications channel from a number of different sources, such as through network monitoring, Real Time Control Protocol (RTCP) records, a client terminal used by a participant, and so forth. In effect, the original video bitstream is not necessarily decoded but rather selectively "pruned" so that only a subset of the video frames is transmitted. The algorithm responsible for pruning the original video bitstream takes into account the dependency among the frames established by a given video encoder (e.g., group of picture structure), as well as other factors described in more detail below.

Figure 1:
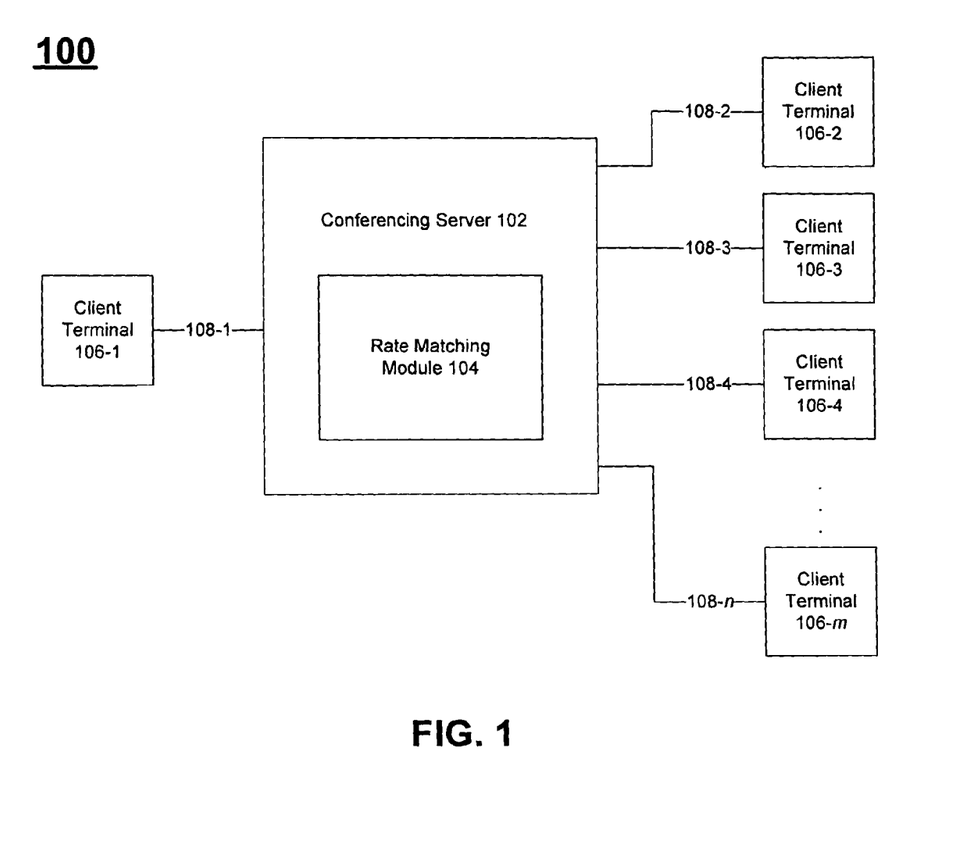
FIG. 1 illustrates an exemplary embodiment of a conferencing system.

FIG. 1 illustrates a block diagram for a multimedia conferencing system 100. Multimedia conferencing system 100 may represent a general system architecture suitable for implementing various embodiments. Multimedia conferencing system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conferencing system 100 as shown in FIG. 1 has a limited number of elements in a certain topology, it may be appreciated that multimedia conferencing system 100 may include more or less elements in alternate topologies as desired for a given implementation. The embodiments are not limited in this context.

In various embodiments, multimedia conferencing system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth. It is noted that while some embodiments may be described specifically in the context of selectively removing video frames from video information to reduce video bit rates, various embodiments encompasses the use of any type of desired media information, such as pictures, images, data, voice, music or any combination thereof.

In various embodiments, multimedia conferencing system 100 may include a conferencing server 102. Conferencing server 102 may comprise any logical or physical entity that is arranged to manage or control a multimedia conference call between client terminals 106-1-$m$. In various embodiments, conferencing server 102 may comprise, or be implemented as, a processing or computing device, such as a computer, a server, a router, a switch, a bridge, and so forth. A specific implementation for conferencing server 102 may vary depending upon a set of communication protocols or standards to be used for conferencing server 102. In one example, conferencing server 102 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. In another example, conferencing server 102 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. Both the H.323 and SIP standards are essentially signaling protocols for Voice over Internet Protocol (VoIP) or Voice Over Packet (VOP) multimedia conference call operations. It may be appreciated that other signaling protocols may be implemented for conferencing server 102, however, and still fall within the scope of the embodiments. The embodiments are not limited in this context.

In various embodiments, multimedia conferencing system 100 may include one or more client terminals 106-1-$m$ to connect to conferencing server 102 over one or more communications links 108-1-$n$, where m and n represent positive integers that do not necessarily need to match. For example, a client application may host several client terminals each representing a separate conference at the same time. Similarly, a client application may receive multiple media streams. For example, video streams from all or a subset of the participants may be displayed as a mosaic on the participant's display with a top window with video for the current active speaker, and a panoramic view of the other participants in other windows. Client terminals 106-1-$m$ may comprise any logical or physical entity that is arranged to participate or engage in a multimedia conference call managed by conferencing server 102. Client terminals 106-1-$m$ may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad touch screen), and so forth. Examples of client terminals 106-1-$m$ may include a telephone, a VoIP or VOP telephone, a packet telephone designed to operate on a Packet Switched Telephone Network (PSTN), an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. The embodiments are not limited in this context.

In various embodiments, multimedia conferencing system 100 may comprise, or form part of, a wired communications system, a wireless communications system, or a combination of both. For example, multimedia conferencing system 100 may include one or more elements arranged to communicate information over one or more types of wired media communications channels. Examples of a wired media communications channel may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Multimedia conferencing system 100 also may include one or more elements arranged to communicate information over one or more types of wireless media communications channels. Examples of a wireless media communications channel may include, without limitation, a radio channel, infrared channel, radio-frequency (RF) channel, Wireless Fidelity (WiFi) channel, a portion of the RF spectrum, and/or one or more licensed or license-free frequency bands.

Multimedia conferencing system 100 also may be arranged to operate in accordance with various standards and/or protocols for media processing. Examples of media processing standards include, without limitation, the Society of Motion Picture and Television Engineers (SMPTE) 421M ("VC-1") series of standards and variants, VC-1 implemented as MICROSOFT® WINDOWS® MEDIA VIDEO version 9 (WMV-9) series of standards and variants, Digital Video Broadcasting Terrestrial (DVB-T) broadcasting standard, the ITU/IEC H.263 standard, Video Coding for Low Bit rate Communication, ITU-T Recommendation H.263v3, published November 2000 and/or the ITU/IEC H.264 standard, Video Coding for Very Low Bit rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

In one embodiment, for example, conferencing server 102 and client terminals 106-1-$m$ of multimedia conferencing system 100 may be implemented as part of an H.323 system operating in accordance with one or more of the H.323 series of standards and/or variants. H.323 is an ITU standard that provides specification for computers, equipment, and services for multimedia communication over networks that do not provide a guaranteed quality of service. H.323 computers and equipment can carry real-time video, audio, and data, or any combination of these elements. This standard is based on the IETF RTP and RTCP protocols, with additional protocols for call signaling, and data and audiovisual communications. H.323 defines how audio and video information is formatted and packaged for transmission over the network. Standard audio and video coders/decoders (codecs) encode and decode input/output from audio and video sources for communication between nodes. A codec converts audio or video signals between analog and digital forms. In addition, H.323 specifies T.120 services for data communications and conferencing within and next to an H.323 session. The T.120 support services means that data handling can occur either in conjunction with H.323 audio and video, or separately, as desired for a given implementation.

In accordance with a typical H.323 system, conferencing server 102 may be implemented as an MCU coupled to an H.323 gateway, an H.323 gatekeeper, one or more H.323 terminals 106-1-$m$, and a plurality of other devices such as personal computers, servers and other network devices (e.g., over a local area network). The H.323 devices may be implemented in compliance with the H.323 series of standards or variants. H.323 client terminals 106-1-$m$ are each considered "endpoints" as may be further discussed below. The H.323 endpoints support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 endpoints may further implement various audio and video codecs, T.120 data conferencing protocols and certain MCU capabilities. Although some embodiments may be described in the context of an H.323 system by way of example only, it may be appreciated that multimedia conferencing system 100 may also be implemented in accordance with one or more of the IETF SIP series of standards and/or variants, as well as other multimedia signaling standards, and still fall within the scope of the embodiments. The embodiments are not limited in this context.

In general operation, multimedia conference system 100 may be used for multimedia conference calls. Multimedia conference calls typically involve communicating voice, video, and/or data information between multiple end points. For example, a public or private packet network may be used for audio conferencing calls, video conferencing calls, audio/video conferencing calls, collaborative document sharing and editing, and so forth. The packet network may also be connected to the PSTN via one or more suitable VoIP gateways arranged to convert between circuit-switched information and packet information. To establish a multimedia conference call over a packet network, each client terminal 106-1-$m$ may connect to conferencing server 102 using various types of wired or wireless media communications channels 108-1-$n$ operating at varying connection speeds or bandwidths. For example, client terminal 106-2 may connect to conferencing server 102 using a lower bandwidth PSTN telephone connection, client terminal 106-3 may connect to conferencing server 102 using a medium bandwidth DSL modem connection or cable modem connection, and client terminal 106-4 may connect to conferencing server 102 using a higher bandwidth intranet connection over a local area network (LAN). In this case, conferencing server 102 experiences a phenomenon sometimes referred to as bandwidth heterogeneity.

In various embodiments, conferencing server 102 may include a rate matching module 104. Due to bandwidth heterogeneity, conferencing server 102 typically needs to perform some form of data rate matching to adjust data rates between respective connections. Further, such rate matching operations are typically dynamic to accommodate instantaneous changes in the dominant speaker, traffic conditions and client terminals. Rate matching module 104 may be arranged to perform rate matching operations for conferencing server 102 to solve these and other problems. In one embodiment, for example, rate matching module 104 may perform rate matching operations by selectively removing video frames from a group of pictures received on a first media communications channel, in order to reduce a bit rate for the group of pictures to a speed that is equal to or less than a bandwidth available for a second media communications channel. Rate matching is done on each separate media channel. Conferencing server 102 and rate matching module 104 may be described in more detail with reference to FIG. 2.

Figure 2:
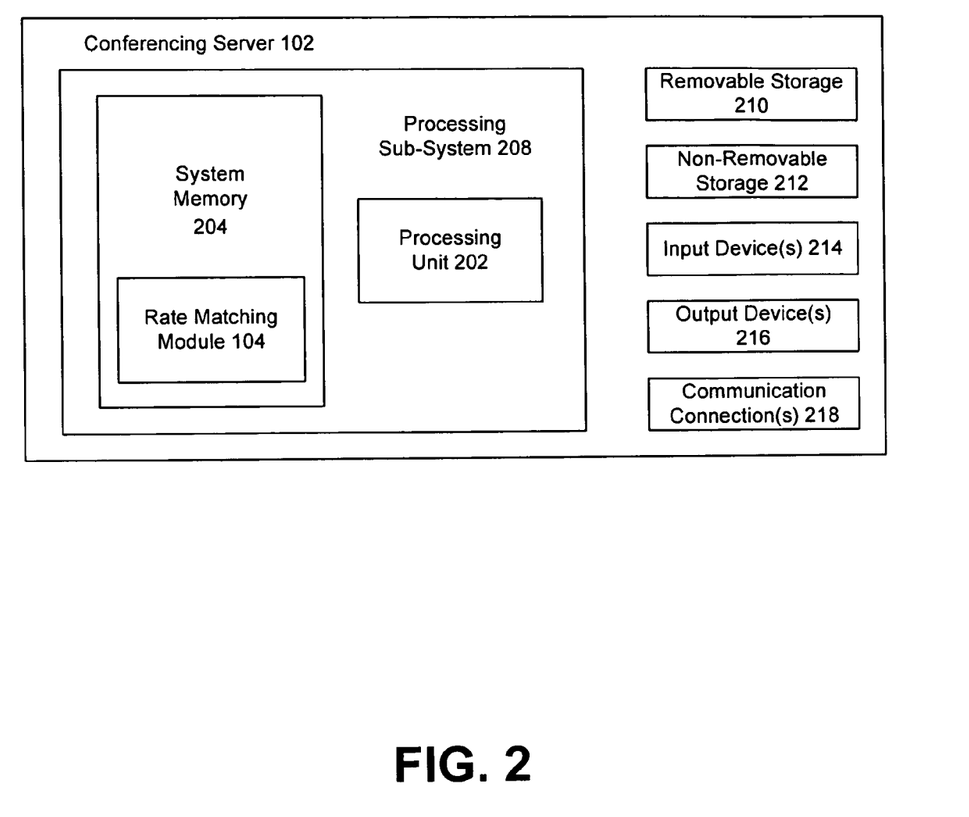
FIG. 2 illustrates an exemplary embodiment of a conferencing server.

FIG. 2 illustrates a more detailed block diagram of conferencing server 102. In its most basic configuration, conferencing server 102 typically includes a processing sub-system 208 that comprises at least one processing unit 202 and memory 204. Processing unit 202 may be any type of processor capable of executing software, such as a general-purpose processor, a dedicated processor, a media processor, a controller, a microcontroller, an embedded processor, a digital signal processor (DSP), and so forth. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 1, memory 204 may store various software programs, such as rate matching module 104 and accompanying data. The software program 204 may have to be duplicated in the memory if it is designed to handle one media stream at a time. Likewise, processor 202 and rate matching program 204 may be duplicated several times if the host system is a multi-core microprocessor-based computing platform. Memory 204 may also store other software programs to implement different aspects of conferencing server 102, such as various types of operating system software, application programs, video codecs, audio codecs, call control software, gatekeeper software, multipoint controllers, multipoint processors, and so forth. Alternatively such operations may be implemented in the form of dedicated hardware (e.g., DSP, ASIC, FPGA, and so forth) or a combination of hardware, firmware and/or software as desired for a given implementation. The embodiments are not limited in this context.

Conferencing server 102 may also have additional features and/or functionality beyond configuration 106. For example, conferencing server 102 may include removable storage 210 and non-removable storage 212, which may also comprise various types of machine-readable or computer-readable media as previously described. Conferencing server 102 may also have one or more input devices 214 such as a keyboard, mouse, pen, voice input device, touch input device, and so forth. One or more output devices 216 such as a display, speakers, printer, and so forth may also be included in conferencing server 102 as well.

Conferencing server 102 may further include one or more communications connections 218 that allow conferencing server 102 to communicate with other devices. Communications connections 218 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes both wired communications media and wireless communications media, as previously described. The terms machine-readable media and computer-readable media as used herein are meant to include both storage media and communications media.

In various embodiments, rate matching module 104 may perform rate matching operations for conferencing server 102. Due to bandwidth heterogeneity, conferencing server 102 faces several problems when managing a multimedia conference call between client terminals 106-1-$m$. For example, conferencing server 102 needs to adjust and communicate a video bistream to each client terminal 106-1-$m$ using the available communication channel bandwidth of media communications channels 108-1-$n$. Further, conferencing server 102 needs to adjust the video bitstream in time to take into account the time varying nature of the bandwidth available on each media communications channel 108-1-$n$.

Rate matching module 104 may be arranged to perform rate matching for a multimedia conference call between multiple client terminals using different media communications channels of varying bandwidths. This may be accomplished using the structure of a given video bistream (e.g., VC-1 bitstream) to adjust the number of frames sent to a given client terminal. The concept involves adjusting the bit rate in a non-regular, time varying fashion so as to match the capacity of the communication channel as closely as possible. More particularly, the concept involves making a Group of Pictures (GOP) structure variable in time so as to track the instantaneous variations of connection bandwidth in time.

In some embodiments, rate matching module 104 may perform rate matching operations by reducing a bit rate for a set of video information, such as a GOP, or some other defined set of video information. A GOP in video is a set of video frames that have all been encoded from the same reference key frame. Rate matching module 104 may reduce a bit rate by selectively removing frames of video information from each GOP structure in the video bitstream. The amount of reduction may be controlled by the type and number of frames selected for removal from the GOP structure. In this manner the original GOP may be sent at a bit rate that is equal to or less than the bandwidth available to a media communications channel 108-1-$n$ for a given client terminal 106-1-$m$. The original GOP structure is selectively reduced so that only a subset of the video frames is transmitted. The selective reduction of the original GOP takes into account the dependency among the frames established by a given video encoder, and other factors as well.

For purposes of illustration only, rate matching operations by selectively removing frames of video information from a video bitstream may be described with reference to a VC-1 video bitstream by way of example, as described in detail with reference to FIGS. 3-10. It may be appreciated, however, that the rate matching operations of rate matching module 104 may be applied to any structured or defined video bitstream as desired for a given implementation. By way of example, and not limitation, the rate matching operations of rate matching module 104 may be applied to a MPEG-2 or H.264 video bitstream which both share similar structures. The embodiments are not limited in this context.

Figure 3:
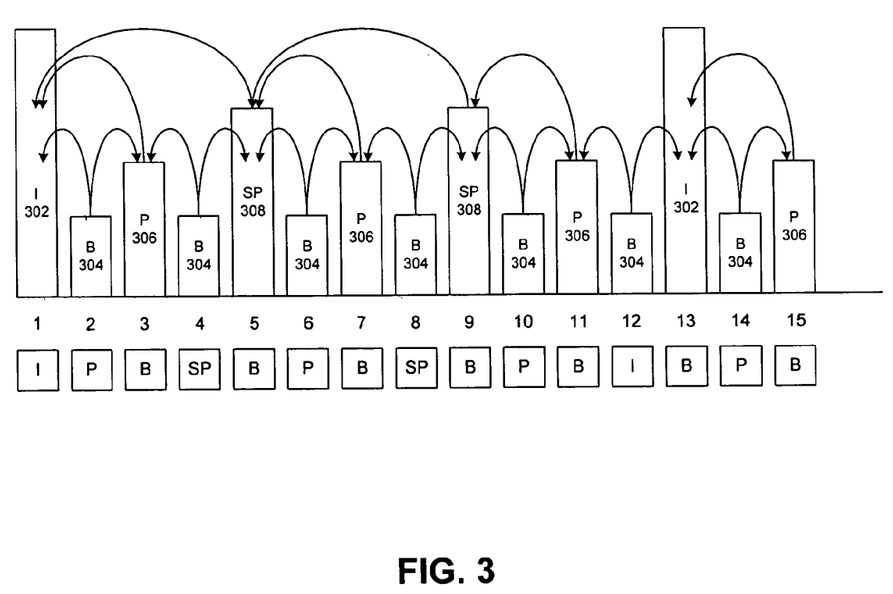
FIG. 3 illustrates an exemplary embodiment of a video frame sequence.

FIG. 3 illustrates an example of a VC-1 (SMPTE 421M) video bitstream as received by conferencing server 102. In video compression formats, such as in ITU-T, MPEG, or SMPTE VC-1 video standards, often only the differences between pictures will be encoded. For example, in a scene in which a person walks past a stationary background, only the moving region will need to be encoded either as motion vectors or as image data or as a combination of the two, depending on which representation uses the fewest bits to adequately represent the picture. The parts of the scene that are not changing need not be sent repeatedly. Strictly speaking, the term picture is a more general term than frame, as a picture can be either a frame or a field, where a frame is essentially an image captured at some instant in time and a field is the set of every-other line that would form an image at some instant in time. When sending video in interlaced-scan format, for example, the coding of pictures as individual fields is often used rather than the coding of complete frames. As used herein, the term "frame" is used interchangeably with the more general term "picture." Typically, pictures are segmented into macroblocks, and individual prediction types can be selected on a macroblock basis rather than being the same for the entire picture. Furthermore, in some video codec standards such as MPEG-2 video, VC-1 and H.264, the picture can be segmented into smaller regions called "slices" and instead of using specific picture type selections, the video encoder can choose the prediction style distinctly on each individual slice.

As shown in FIG. 3, a VC-1 video bitstream is typically comprised of multiple, consecutive GOP structures comprising several different types of encoded video frames, such as an Intra (I) frame 302, a Predictive (P) frame 306, a Super Predictive (SP) frame 308, and a Bi-Predictive or Bi-Directional (B) frame 304. Each of these video frame types is encoded according to different rules in the video encoder. In particular, the dependency on other neighboring frames is different. FIG. 3 illustrates the frame dependencies of a typical VC-1 video bitstream. As indicated by the arrows in FIG. 3, the B frames 304 are coded differentially from other neighbor and decoded P frames 306, SP frames 308 or I frames 302. B frames 304 therefore are the frames that have the highest degree of dependency on other video frames. P frames 306 are coded differentially from the previous decoded I frame 302 or P frame 306. As opposed to a B frame 304 which is dependent on 2 frames, a P frame 306 is dependent only on a single video frame. SP frames 308 are special P frames decoded from previously decoded and cached frames. Although FIG. 3 illustrates the SP frames 308 as depending from a previous I frame 302 or SP frame 308, the SP frames 308 may depend from any previously decoded and cached frame. The underlying transport protocol (e.g., RTP) can be used to signal which frames a decoder must store as cached frames. Finally, I frames 302 are frames that do not need any other frames to be decoded. They are therefore the most independent frames and as such are often referenced as "key" frames.

Figure 4:
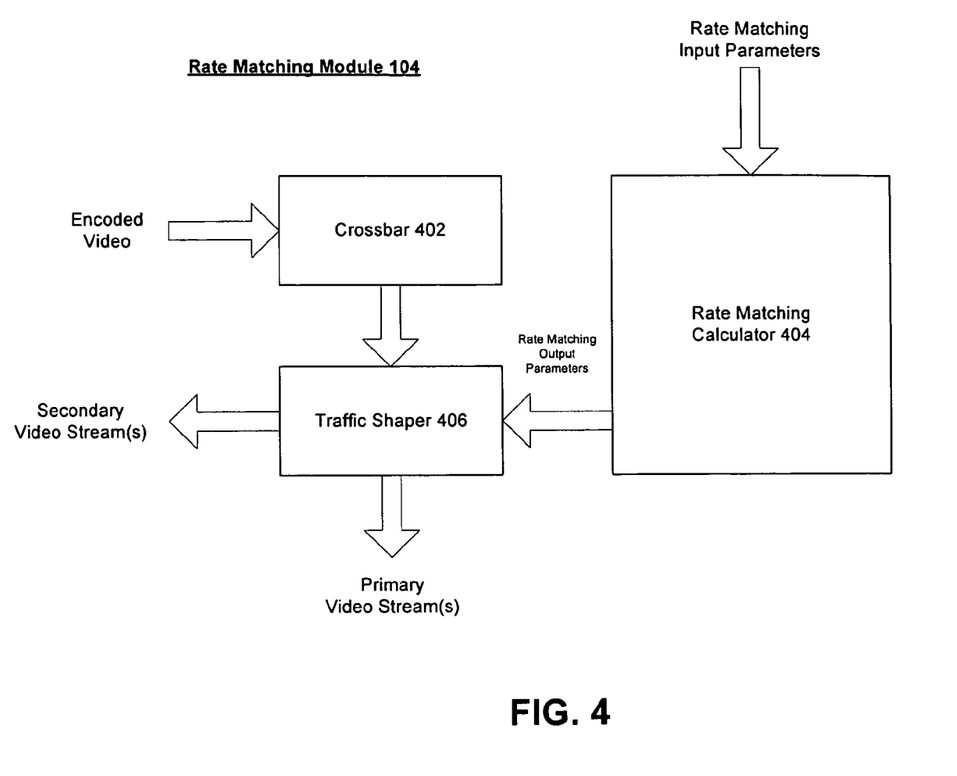
FIG. 4 illustrates an exemplary embodiment of a rate matching module.

FIG. 4 provides a more detailed illustration for rate matching module 104 to process a video bitstream (e.g. VC-1 bitstream), such as the one described with reference to FIG. 3. As shown in FIG. 4, a crossbar 402 of rate matching module 104 may receive an encoded video bitstream, such as a VC-1 encoded video bitstream, for example. Crossbar 402 may comprise a video crossbar arranged to receive an encoded video bitstream from a currently active speaking client terminal 106-1-*m* and a previously active speaking client terminal 106-1-*m*. At any given point in time during a multimedia conference call, one of the participants may be designated as active speaker. Designation of a participant as an active speaker may be manual (someone in the conference manages the audio sources) or automatic, by means of a dominant speaker algorithm. Although there are typically many participants talking at once, conferencing server 102 attempts to select which participant is the active speaker from among the group of currently speaking participants. For example, assume that client terminal 106-1 is the current active speaker, and that client terminal 106-2 was the previously active speaker. Crossbar 402 may receive the encoded video bitstreams from both client terminals 106-1, 106-2. Crossbar 402 attempts to identify the proper receiving client terminals 106-1-*m* for each video stream. For example, the video stream associated with the current active speaking client terminal 106-1 goes to all client terminals 106-2-4, except the current active speaker 106-1 who receives the video of the previous active speaking client terminal 106-2. This is because there is no need for the current active speaking client terminal 106-1 to view him/herself in the main video window as he/she already has a preview window produced locally.

As crossbar 402 is receiving the encoded video bitstream, a rate matching calculator 404 may be periodically or continuously receiving a set of rate matching input parameters. The rate matching input parameters comprise a set of input parameters relevant to calculating which frames should be removed from the encoded video bitstream to effectively reduce a bit rate for the video bitstream. Examples of rate matching input parameters are described in more detail with reference to FIG. 10. Rate matching calculator 404 receives the set of rate matching input parameters, calculates which frames should be removed from the received video bitstream based on the rate matching input parameters, and outputs a set of rate matching output parameters to traffic shaper 406.

Continuing with our example, assume that client terminal 106-1 is the active speaker and has a media communications channel 108-1 with a relatively high potential bandwidth (e.g., T1 connection speeds). Crossbar 402 may receive the encoded video bitstream from client terminal 106-1 and output the received bitstream to traffic shaper 406. Traffic shaper 406 may receive the video bitstream from crossbar 402. Traffic shaper 406 may also receive a set of rate matching output parameters from rate matching calculator 404. Traffic shaper 406 may selectively remove one or more video frames from the video bitstream received from crossbar 402 in accordance with the set of rate matching output parameters received from rate matching calculator 404. One of the main functions performed by traffic shaper 406 is to remove video frames by identifying the packets carrying the data of the video frames that need to be removed. Traffic shaper 406 may output the video bitstream with the reduced bit rate as primary video streams and/or secondary video streams. The primary video streams and secondary video streams may comprise a subset of video information included with the encoded video bitstream received by crossbar 402. The primary video streams and secondary video streams may then be routed through corresponding communication connections 218 of conferencing server 102 over the appropriate media communications channels 108-2-4 to receiving client terminals 106-2-4. Client terminals 106-2-4 may receive and decode the video streams for reproduction on a display for a participant in the conference call. Operations for rate matching module 104 may be described in more detail with reference to FIGS. 5-10.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
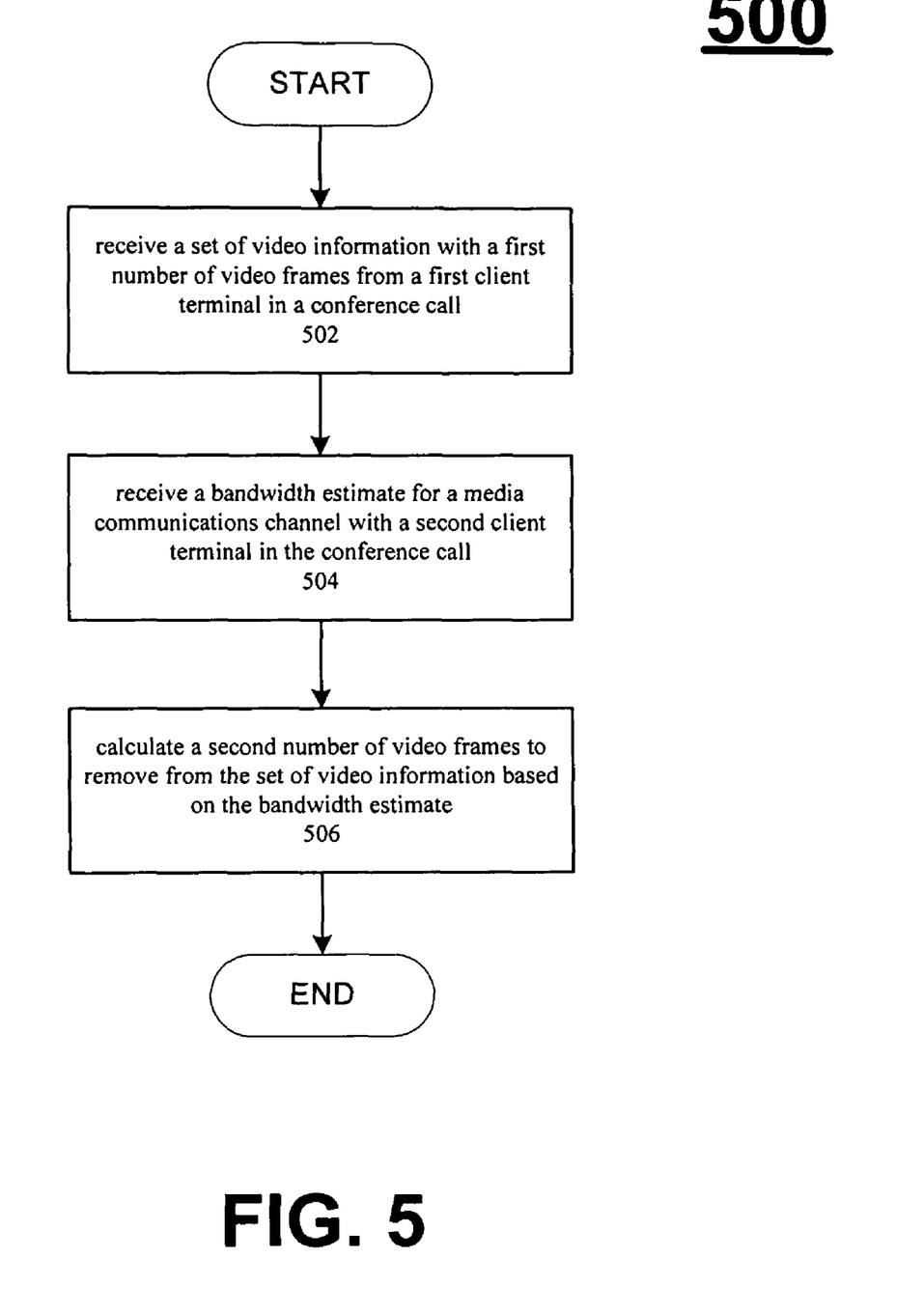
FIG. 5 illustrates an exemplary embodiment of a logic flow.

FIG. 5 illustrates one embodiment of a logic flow 500. Logic flow 500 may be representative of the operations executed by one or more embodiments described herein, such as multimedia conferencing system 100, conferencing server 102, and/or rate matching module 104. As shown in FIG. 5, a set of video information with a first number of video frames may be received from a first client terminal in a conference call at block 502. A media communication channel bandwidth estimate for a media communications channel with a second client terminal in the conference call may be received at block 504. A second number of video frames to remove from the set of video information may be calculated based on the media communication channel bandwidth estimate at block 506. For example, the second number may be calculated to achieve a bit rate that is equal to or less than the bandwidth estimate. The embodiments are not limited in this context.

In various embodiments, for example, calculating the second number may be based on a defined structure for the set of video information, with the defined structure including multiple video frame types and a frame ordering sequence. Calculating the second number may also be based on a video frame type and the average or typical/estimated number of bytes it takes to represent such a video frame and a number of frames per GOP for that video frame type. Calculating the second number may further be accomplished using a set of input parameters. The set of input parameters may be received to calculate the second number, with the input parameters comprising an encoder GOP structure, a video bit rate for the set of video information, a representative number of bits used for each frame type for the first number of video frames, and a frame ordering sequence. A set of output parameters generated using the input parameters may be sent or outputted, with the set of output parameters comprising a remove frame type, a number of remove frames for the remove frame type, and a location for each remove frame in the set of video information. Information produced by 506 may also be a schedule for removing video frames over multiple GOPs. The calculated second number of video frames may be removed from the set of video information in accordance with the set of output parameters. The reduced set of video information may be sent with a third number of video frames to the second client terminal over the media communications channel, with the third number of video frames to be less than the first number of video frames. The embodiments are not limited in this context.

The logic flow of FIG. 5 may be further described by way of example. Assume that client terminals 106-1-4 all engage in a video conference call via conferencing server 102. Further assume that client terminal 106-1 is the currently dominant speaker and has a media communications channel 108-1 with a higher potential bandwidth (e.g., T1 connection speeds). Conference server 102 may receive a set of video information with a first number of video frames from client terminal 106-1. Conference server 102 will need to distribute the received video information to the other participants in the video conference call over media communications channels 108-2-4 for client terminals 106-2-4. As previously described, client terminal 106-2 may connect to conferencing server 102 using a lower bandwidth PSTN telephone connection (e.g., media communications channel 108-2), client terminal 106-3 may connect to conferencing server 102 using a medium bandwidth DSL modem connection or cable modem connection (e.g., media communications channel 108-3), and client terminal 106-4 may connect to conferencing server 102 using a higher bandwidth intranet connection over a LAN (e.g., media communications channel 108-4) similar to media communications channel 108-1. Since media communications channels 108-1, 108-4 share a similar level of bandwidth, conferencing server 102 simply passes the original VC-1 bitstream received from client terminal 106-1 over higher speed media communications channel 108-1 to client terminal 106-4 via higher speed media communications channel 108-4. For those media communications channels with a bandwidth lower than media communications channel 108-1, however, conferencing server 102 passes the VC-1 bitstream to rate matching module 104 to perform rate matching operations between media communications channels.

Once rate matching module 104 receives the VC-1 bitstream, rate matching module 104 attempts to reduce the bit rate for the VC-1 bitstream to match the bandwidth available on the remaining media communications channels 108-2, 108-3. Rate matching module 104 receives a media communication channel bandwidth estimate for each respective media communications channel, and begins rate matching operations. Rate matching calculator 404 may calculate a number of frames and of which frame types to remove from the VC-1 bitstream in order to reduce the frame rate and effective bit rate for the VC-1 bitstream to equal or less than the media communication channel bandwidth estimate received for the media communications channel. Rate matching calculator 404 may perform the calculations based on a defined structure for the VC-1 bitstream, with the defined structure including multiple frame types (e.g., I, P, SP, B) and a frame ordering sequence (e.g., dependency between frame types). Essentially, rate matching calculator 404 will receive a set of rate matching input parameters that will allow rate matching calculator 404 to determine a bandwidth savings associated with each frame type, and with this information rate matching calculator 404 can determine which frame types and number of frames for each frame type needs to be removed to reach the reduced target bit rate. Rate matching calculator 404 may pass this information to traffic shaper 406 via a set of rate matching output parameters. Traffic shaper 406 may then actually remove the frame types and number of each frame type to form the output video bitstreams appropriate for each of client terminals 106-2, 106-3. Information supplied to traffic shaper 406 may be time-varying so adaptation to network bandwidth conditions can be done in real time.

Figure 6:
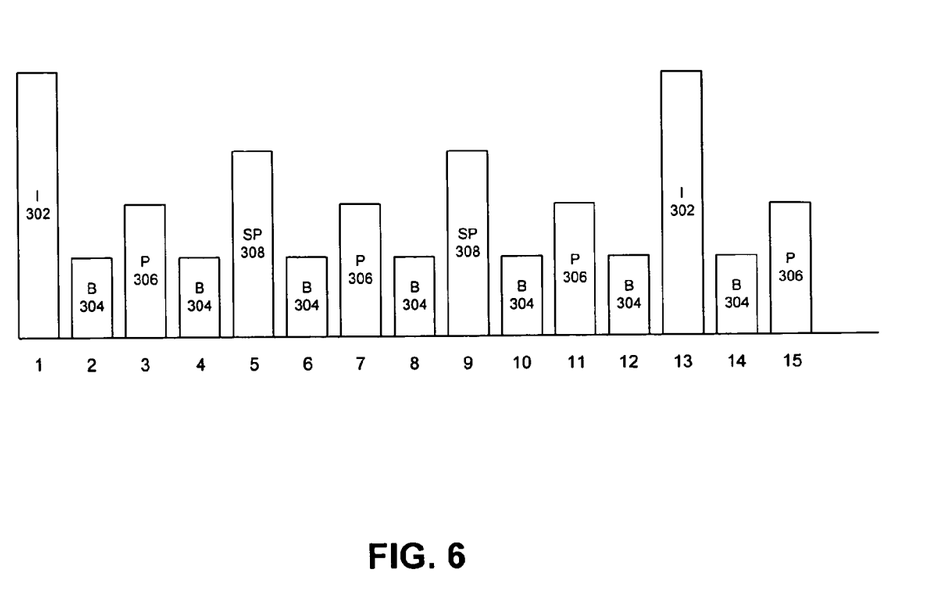
FIG. 6 illustrates an exemplary embodiment of a first frame sequence.

FIG. 6 illustrates an example of an original VC-1 bitstream. As shown in FIG. 6, a typical VC-1 video bitstream may comprise 15 video frames, including two I frames 302, four P frames 306, two SP frames 308, and seven B frames 304. The VC-1 video bitstream may have a frame ordering sequence (or dependency) as indicated by the arrows in FIG. 6. The original VC-1 bitstream is representative of the video bitstream received by crossbar 402 prior to performing any rate matching operations.

Figure 7:
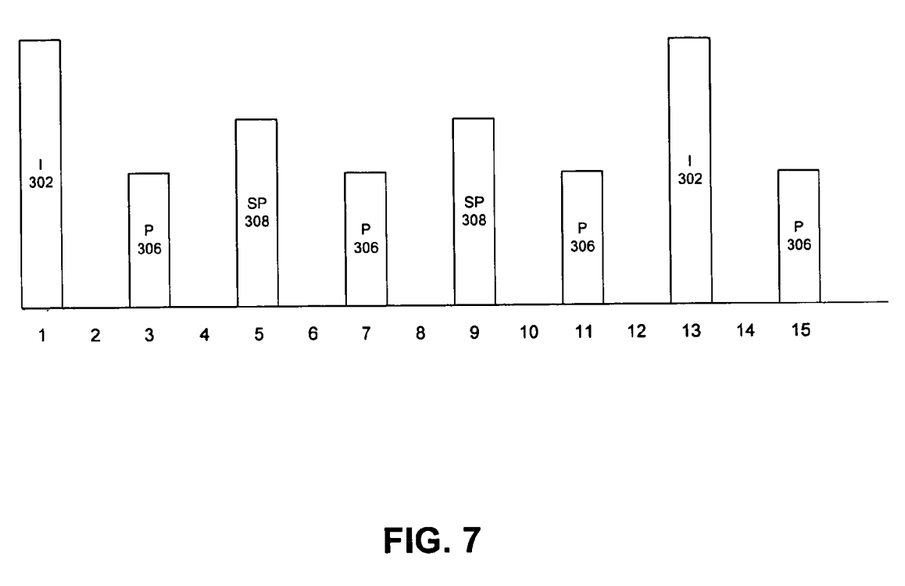
FIG. 7 illustrates an exemplary embodiment of a second frame sequence.

FIG. 7 illustrates an example of an original VC-1 bitstream with a first set of video frames removed to reduce a bit rate for the VC-1 bitstream. Rate matching calculator 404 may order the selective reduction of frame types for the VC-1 bitstream based on a frame ordering sequence. Since B frames 304 represent differentially encoded frames of video information dependent upon other frames for decoding, B frames 304 typically use the fewest number of bits to represent a video frame and also represent the least reduction in video quality. Consequently, rate matching calculator 404 may be arranged to remove some or all of the B frames 304 first in order to achieve the desired reduction in bit rate. As shown in FIG. 7, rate matching calculator 404 may initiate bit rate reductions by selecting B frames 304 as a remove frame type, a number of remove frames (e.g., seven) for the remove frame type, and a location for each remove frame in the video bitstream (e.g., frame locations 2, 4, 6, 8, 12 and 14).

Figure 8:
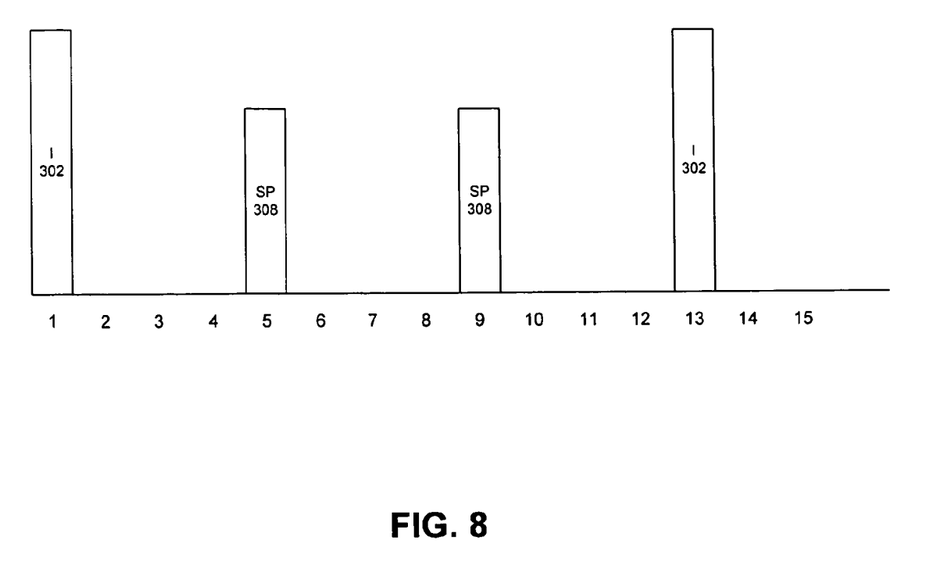
FIG. 8 illustrates an exemplary embodiment of a third frame sequence.

FIG. 8 illustrates an example of an original VC-1 bitstream with a first and second set of video frames removed to reduce a bit rate for the VC-1 bitstream. To further reduce the bit rate associated with the original VC-1 bitstream as described with reference to FIG. 6, rate matching calculator 404 may select other remove frame types and number of remove frames in addition to the B frames 304. For example, rate matching calculator 404 may be arranged to remove some or all of the P frames 306 in order to achieve the desired reduction in bit rate. As shown in FIG. 8, rate matching calculator 404 may initiate further bit rate reductions by selecting B frames 304 and P frames 306 as remove frame types, a number of seven B remove frames and four P remove frames, and locations for each remove frame in the video bitstream (e.g., frame locations 2-4, 6-8, 10-12, 14 and 15). FIG. 8 shows the extreme case where all P frames 306 are removed but the rate matching calculator 404 may indicate to the traffic shaper 406 to remove only a portion of the P frames 306 in the same GOP.

Figure 9:
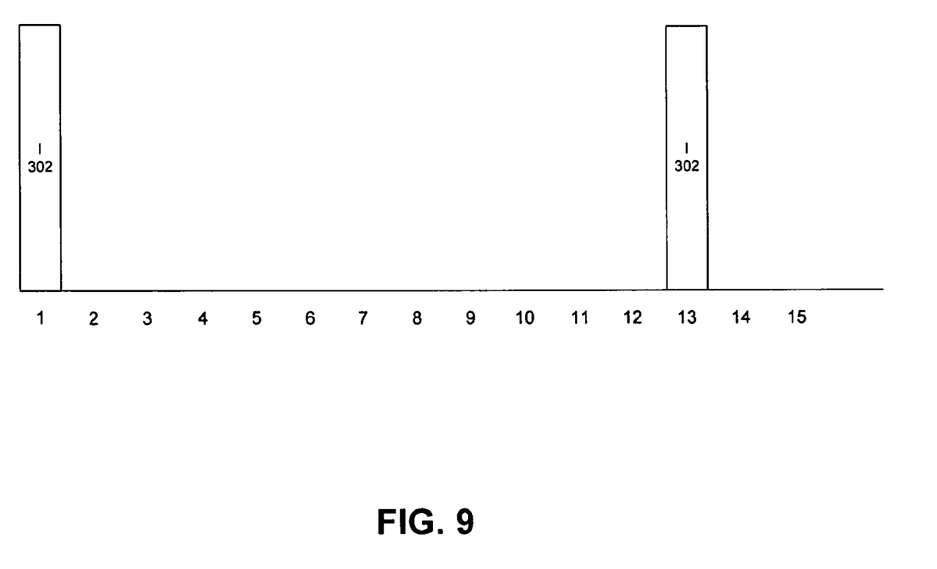
FIG. 9 illustrates an exemplary embodiment of a fourth frame sequence.

FIG. 9 illustrates an example of an original VC-1 bitstream with a first, second and third set of video frames removed to reduce a bit rate for the VC-1 bitstream. To further reduce the bit rate associated with the original VC-1 bitstream as described with reference to FIG. 6, rate matching calculator 404 may select other remove frame types and number of remove frames in addition to the B frames 304 and P frames 306. For example, rate matching calculator 404 may be arranged to remove some or all of the SP frames 308 in order to achieve the desired reduction in bit rate. As shown in FIG. 9, rate matching calculator 404 may initiate even further bit rate reductions by selecting B frames 304, P frames 306 and SP frames 308 as remove frame types, a number of seven B remove frames, four P remove frames, and two SP frames, and locations for each remove frame in the video bitstream (e.g., frame locations 2-12, 14 and 15). This may be appropriate for the lowest connection bandwidths (e.g., 108-3), for example, where only the I frames are transmitted. The content of the video stream changes once every T seconds, where T is the length of the GOP in seconds. It is also possible that rate matching module 104 may determine not to send all I frames but only a subset of them if the bandwidth is extremely low. Again in this case, not all SP frames 308 but only a portion of them may be removed to match the current network bandwidth conditions. In extreme cases, only one I frame 302 or no video may be transmitted for an entire video conferencing session.

Figure 10:
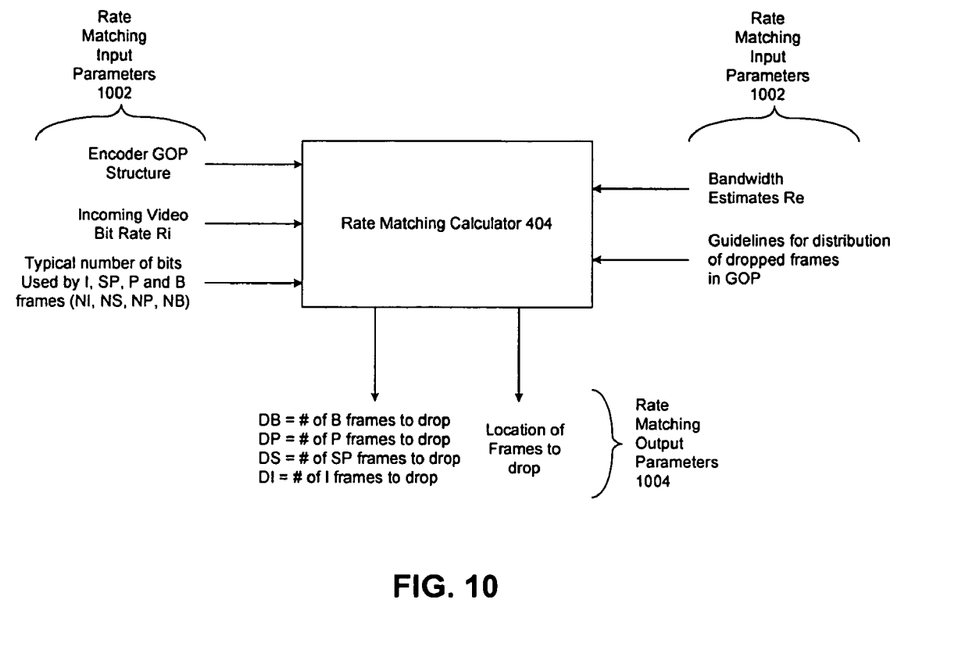
FIG. 10 illustrates an exemplary embodiment of a rate matching calculator.

FIG. 10 illustrates a more detailed embodiment of rate matching calculator 404. FIG. 10 illustrates rate matching calculator 404 receives multiple rate matching input parameters 1002 and outputting multiple rate matching output parameters 1004. For each client terminal 106-1-$m$, rate matching calculator 404 may receive a number of rate matching input parameters 1002, as follows:
1. Ri—the bit rate of the incoming video representing the current speaker.
2. Re—the bandwidth estimate indicating the bit rate available on the connection between the Audio/Video MCU (server) and the participant.
3. NI, NS, NP, NB—representative numbers for how many bits are usually required to represent an I, SP, P or B frame, respectively.
4. Policy Guidelines for how the bitstream should be pruned, such as ranking in preference order for the locations of the B, P, SP and I frames to remove from the original bitstream.
5. Structure of a Group of Pictures, such as an I frame followed by any SP, P and B frames that are differentially encoded from that frame. Assume that the number of frames I, SP, P and B frames in a GOP is FI, FS, FP and FB, respectively, where FI=1 by definition (e.g., one key frame per GOP).

Rate matching calculator 404 may receive one or more of the rate matching input parameters, and output one or more rate matching output parameters 1004, as follows:
1. A number of remove frame types (e.g., I, SP, P and B frames) and a number of remove frames of each remove frame type (e.g., seven B frames) to remove to match the bandwidth estimate Re as closely as possible.
2. The location of the frames to drop, such as a location in the GOP or in the next few consecutive GOP depending on how fast the bandwidth estimates are updated and depending on the length of the GOP.

Rate matching calculator 404 may process each set of rate matching input parameters 1002 to create a corresponding set of rate matching output parameters 1004 in a number of ways.

In one embodiment, for example, operations for a suitable rate matching calculating algorithm may be performed as follows:
1. Calculate Diff=Ri–Re. If the difference is zero or negative do nothing. If it is positive, however, the difference represents a bit rate reduction to achieve so the video can be transmitted to the appropriate client terminal 106-1-$m$.
2. Identify the number of B frames to drop. Calculate DiffB=Diff–(FB*NB). All B frames must be dropped if DiffB is greater than 0. If DiffB is negative, find the value fB such that DiffB=Diff–(fB*NB) is as close to 0 as possible. The value for DiffB, however, should be negative. The value for fB which is less than FB represents the number of B frames to remove.
3. If DiffB is positive, identify the number of P frames to drop. Calculate DiffP=DiffB–(FP*NP). All P frames must be dropped if DiffP is greater than 0. If DiffP is negative, find the value fP such that DiffP=DiffB–(fP*NP) is as close to 0 as possible. The value for DiffP, however, should be negative. The value for fP which is less than FP represents the number of P frames to remove.
4. If DiffP is positive, identify the number of SP frames to drop. Calculate DiffS=DiffP–(FS*NS). All SP frames must be dropped if DiffS is greater than 0. If DiffS is negative, find the value fS such that DiffS=DiffP–(fS*NS) is as close to 0 as possible. The value for DiffS, however, should be negative. The value for fS which is less than FS represents the number of SP frames to remove
5. If DIffS is positive, identify the number of I frames to drop. In this case, the quantity DiffS/NI provides the number of I frames to remove per second. This number which is typically a quantity less than one (1) should be normalized to a larger time window so it can be made relative to the removal of one I frame. For example, one I frame may be removed every 30 seconds, meaning that one out of three I frames must be removed if each GOP length is 10 seconds long.

Rate matching module 104 may be further optimized to enhance performance based on a number of different factors. For example, conferencing server 102 should process the video packets efficiently in order to support potentially hundreds or even thousands of participants at the same time. It may therefore be important for rate matching module 104 to be able to inspect each Internet Protocol (IP) packet and determine whether the packet carries data from an I, SP, P or B frame. The RTP packet header may include an extension indicating the type of frame data carried in the payload. If such extension does not exist, however, rate matching module 104 can look into the first few bytes of the RTP packet payload and read the VC-1 frame header where the frame type information is listed. This assumes that video frame boundaries are aligned with RTP packet boundaries. In other words, a new RTP packet is started when a new video frame is transmitted. Alternatively, an extension to the RTP header may be created to carry a flag indicating the beginning or the end of a video frame. This way, rate matching module 104 does not need to inspect every RTP packet but only those that contain data from a new video frame.

In the above-described embodiments, any removed frames may cause the video renderer component in client terminals 106-1-$m$ to either repeat the display of the last video frame or to interpolate the missing video frame based on a motion interpolation scheme. The frame repetition is driven by the bit rate used in a given client terminal 106-1-$m$ (e.g., 15 frames/sec or 30 frames/sec).

In some embodiments, rate matching module 104 assumes that the current dominant speaker is on a high bandwidth connection and is therefore capable to send a video stream with a higher bit rate. A current dominant speaker could of course be on a lower bandwidth connection and as such would not be capable of sending all frames (e.g., no B frames). In such a case, rate matching module 104 may adapt to the video bistream for any client terminals 106-1-*m* that have media communications channels 108-1-*n* with lower connection bandwidth. For client terminals 106-1-*m* with media communications channels 108-1-*n* having connection bandwidths equal to or greater than the current dominant speaker connection bandwidth, rate matching module 104 leaves the VC-1 video bitstream untouched (e.g., no packets are removed).

In some embodiments, rate matching module 104 may use bandwidth estimates supplied by client terminals 106-1-*m* to conferencing server 102. Rate matching module 104, however, may also perform a pre-conference negotiation of bandwidth between conferencing server 102 and each client terminal 106-1-*m*. For example, a protocol could be set in place where either conferencing server 102 requests bandwidth estimates from each client terminal 106-1-*m*, or each client terminal 106-1-*m* automatically notifies conferencing server 102 of the bandwidth available on a corresponding media communications channel 108-1-*n*. For example, client terminal 106-3 can notify conferencing server 102 that it is on a cable modem connection which provides an approximately 500 kilobits-per-second (kbps) uplink and 1 megabit-per-second (mbps) downlink. Similarly, the bandwidth estimate can also come from other network components that supply these estimates to conferencing server 102 without any involvement of the client stack run by client terminals 106-1-*m*.

In one embodiment, for example, a protocol may be established between conferencing server 102 and client terminals 106-1-*m* that involves conferencing server 102 advertising to each receiver what streams are available from each sender, and the receiver subscribing to a collection of streams whose aggregate bit rate is no more than the receiver's bit rate budget. This may improve quality. The improvement can be achieved by receiving distortion information (or equivalent quality or utility information) for each available bit rate for each sender, weighting the distortion information according to its importance to the receiver, and minimizing the weighted average distortion (or maximizing the weighted average quality or utility) subject to the bit rate constraint. This may be accomplished, for example, using a LaGrangian approach.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving a set of video information with a first number of video frames from a first client terminal in a conference call, the set of video information for a current speaker of the conference call;
receiving a video bit rate for said set of video information;
receiving a bandwidth estimate for a media communications channel with a second client terminal in said conference call; and
calculating a second number of video frames to remove from said set of video information based on said video bit rate, said bandwidth estimate, a video frame type and a number of frames for said frame type.

2. The method of claim 1, comprising calculating said second number based on a defined structure for said set of video information, said defined structure including multiple video frame types and a frame ordering sequence.

3. The method of claim 1, comprising:
receiving a set of input parameters comprising a description of a frame type composition used in a group of picture structure, said video bit rate for said set of video information, a representative number of bits used for each frame type for said first number of video frames, and a frame ordering sequence; and
sending a set of output parameters comprising a remove frame type, a number of remove frames for said remove frame type, and a location for each remove frame in said set of video information, where said number and location of remove frames are calculated relative to said group of picture structure or relative to a pre-defined time window.

4. The method of claim 1, comprising removing said second number of video frames from said set of video information in accordance with a set of output parameters.

5. The method of claim 1, said bandwidth estimate to represent an instantaneous channel capacity for said media communications channel.

6. The method of claim 1, said bandwidth estimate to represent changes in network conditions for said media communications channel.

7. The method of claim 1, said bandwidth estimate to represent changes in media processing resources for a second client terminal to receive said video information.

8. The method of claim 1, comprising sending said set of video information with a third number of video frames to a second client terminal over said media communications channel, with said third number of video frames to be less than said first number of video frames.

9. An apparatus, comprising:
a conferencing server; and
a rate matching module to adjust bit rates between media communications channels for client terminals in a conference call, said rate matching module to remove video frames from a group of pictures of a current speaker received on a first media communications channel to reduce a bit rate for said group of pictures, said rate matching module comprising:
a crossbar to receive said group of pictures, and identify a second media communications channel to communicate said group of pictures at said reduced bit rate; and
a rate matching calculator to receive a video bit rate for said group of pictures and a bandwidth estimate for said second media communications channel, and calculate a number of video frames to remove from said group of pictures based on said video bit rate, said bandwidth estimate, a video frame type and a number of frames for said frame type.

10. The apparatus of claim 9, comprising said rate matching calculator to calculate said number of video frames to remove from said group of pictures based on a defined structure for said group of pictures, said defined structure including multiple video frame types and a frame ordering sequence.

11. The apparatus of claim 9, comprising said rate matching calculator to receive a set of input parameters comprising a description of a frame type composition used in a group of picture structure, said video bit rate for said group of pictures, a number of bits used for each frame type for said first number of video frames, and a frame ordering sequence, said rate matching calculator to send a set of output parameters comprising a remove frame type, a number of remove frames for said remove frame type, and a location for each remove frame in said group of pictures.

12. The apparatus of claim 9, comprising a traffic shaper to remove packets of the underlying transport protocol carrying said number of video frames from said group of pictures in accordance with a set of output parameters.

13. The apparatus of claim 9, comprising a network interface to send said group of pictures over said second media communications channel at said reduced bit rate.

14. A multipoint control unit, comprising:
a first communications interface to receive a video bitstream at a video bit rate over a first media communications channel;
a rate matching module coupled to said first communications interface to selectively remove video frames from said video bitstream to reduce said bit rate; and
a second communications interface to send said video bitstream at said reduced bit rate over a second media communications channel;
wherein said rate matching module comprises:
a video crossbar to receive said video bitstream, and identify said second media communications channel to communicate said video bitstream at said reduced bit rate; and
a rate matching calculator to receive a video bit rate for said video bitstream and to receive a bandwidth estimate for said second media communications channel, and calculate a number of video frames to remove from said video bitstream based on said video bit rate, said bandwidth estimate, a video frame type and a number of frames for said frame type.

15. The multipoint control unit of claim 14, comprising said rate matching calculator to receive a set of input parameters comprising a description of a frame type composition used in a group of picture structure, said video bit rate for said video bitstream, a number of bits used for each frame type of said video bitstream, and a frame dependency, said rate matching calculator to send a set of output parameters comprising a remove frame type, a number of remove frames for said remove frame type, and a location for each remove frame in said video bitstream, where said numbers and locations of video frames are calculated relative to said group of picture structure or a pre-defined time window.

16. The multipoint control unit of claim 14, comprising a traffic shaper to selectively remove said video frames from said video bitstream in accordance with a set of received output parameters.

17. An article comprising a computer-readable medium excluding communications media containing instructions that if executed enable a system to receive a set of video information with a first number of video frames from a first client terminal in a conference call, the set of video information for a current speaker of the conference call, receive a video bit rate for said set of video information, receive a bandwidth estimate for a media communications channel with a second client terminal in said conference call, and calculate a second number of video frames to remove from said set of video information based on said video bit rate, said bandwidth estimate, a video frame type and a number of frames for said frame type.

18. The article of claim 17, further comprising instructions that if executed enable the system to calculate said second number based on a defined structure for said set of video information, said defined structure including multiple video frame types and a frame ordering sequence.

19. The article of claim 17, further comprising instructions that if executed enable the system to receive a set of input parameters comprising a description of a frame type composition used in a group of picture structure, said video bit rate for said set of video information, a number of bits used for each frame type for said first number of video frames, and a frame ordering sequence, and send a set of output parameters comprising a remove frame type, a number of remove frames for said remove frame type, and a location for each remove frame in said set of video information.

20. The article of claim 17, further comprising instructions that if executed enable the system to remove said second number of video frames from said set of video information in accordance with a set of output parameters.

* * * * *